US012743681B1

(12) United States Patent
Eutsler et al.

(10) Patent No.: US 12,743,681 B1
(45) Date of Patent: Sep. 22, 2026

(54) DIVIDING NON-FUNGIBLE TOKENS TO DIVIDE RESTRICTED OUTPUT OF CONTENT OBJECTS

(71) Applicant: Wells Fargo Bank, N.A., San Francisco, CA (US)

(72) Inventors: Nathaniel C. Eutsler, San Francisco, CA (US); Matthew Mullin Shepherd, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 270 days.

(21) Appl. No.: 17/948,953

(22) Filed: Sep. 20, 2022

(51) Int. Cl.
*G06Q 20/06* (2012.01)
*G06Q 20/38* (2012.01)
*G06Q 40/04* (2012.01)

(52) U.S. Cl.
CPC ....... *G06Q 20/065* (2013.01); *G06Q 20/3827* (2013.01); *G06Q 40/04* (2013.01)

(58) Field of Classification Search
None
See application file for complete search history.

(56) References Cited

U.S. PATENT DOCUMENTS 11,037,211 B2 6/2021 Preston et al.
11,154,783 B1 10/2021 Koch et al.
11,367,060 B1 * 6/2022 Barbashin .......... H04N 21/2743
11,562,451 B1 * 1/2023 Kozlowski, III ....... G06F 16/27
11,836,690 B1 12/2023 Stroke et al.
2009/0324025 A1 12/2009 Camp et al.
2016/0371776 A1 * 12/2016 Sato .................... G06Q 20/407
2020/0005284 A1 1/2020 Vijayan
2020/0322154 A1 10/2020 Konda et al.
2020/0342539 A1 10/2020 Doney
(Continued)

FOREIGN PATENT DOCUMENTS

CN 113706175 11/2021
EP 3 540 662 A1 9/2019
(Continued)

OTHER PUBLICATIONS

Murray, Michael D. "NFT ownership and copyrights." Ind. L. Rev. 56 (2022): 367. (Year: 2022).*
(Continued)

*Primary Examiner* — Ryan D Donlon
*Assistant Examiner* — Brock E Turk
(74) *Attorney, Agent, or Firm* — Foley & Lardner LLP

(57) ABSTRACT

This technical solution can generate, based on a first content object, a NFT including a link with the first content object and compatible with a first control structure that restricts a first output of the first content object to a first remote device, divide, in response to a request to modify the first content object, the first content object into a second content object and a third content object, generate, based on the second content object, a second NFT including a link with the second content object and compatible with a second control structure that restricts a second output of the second content object to the first remote device, and generate, based on the third content object, a third NFT including a link with the third content object and with a third control structure that restricts a third output of the third content object to a second remote device.

20 Claims, 9 Drawing Sheets

700

(56) References Cited

U.S. PATENT DOCUMENTS

| | | | |
|---|---|---|---|
| 2020/0364373 | A1 | 11/2020 | Huang et al. |
| 2021/0004739 | A1 | 1/2021 | Gill et al. |
| 2021/0065293 | A1 | 3/2021 | Sigler et al. |
| 2021/0097508 | A1 | 4/2021 | Papanikolas |
| 2021/0133700 | A1 | 5/2021 | Williams et al. |
| 2021/0150626 | A1 | 5/2021 | Robotham |
| 2021/0248594 | A1 | 8/2021 | Yantis et al. |
| 2021/0281410 | A1 | 9/2021 | Hain |
| 2021/0326862 | A1 | 10/2021 | Yantis et al. |
| 2021/0374791 | A1 | 12/2021 | Kim |
| 2022/0010316 | A1 | 1/2022 | Novick et al. |
| 2022/0027902 | A1 | 1/2022 | Vandenberg et al. |
| 2022/0058630 | A1 | 2/2022 | Yantis et al. |
| 2022/0058633 | A1 | 2/2022 | Yantis et al. |
| 2022/0075845 | A1 | 3/2022 | Bowen et al. |
| 2022/0101316 | A1 | 3/2022 | Cramer |
| 2022/0222364 | A1* | 7/2022 | Roberts .................. G06F 21/64 |
| 2022/0383295 | A1 | 12/2022 | Cox et al. |
| 2023/0011621 | A1 | 1/2023 | Jakobsson et al. |
| 2023/0034169 | A1 | 2/2023 | Ferenczi |
| 2023/0034621 | A1 | 2/2023 | Pardo |
| 2023/0045071 | A1 | 2/2023 | Kalaldeh et al. |
| 2023/0070586 | A1 | 3/2023 | Kapur et al. |
| 2023/0088936 | A1 | 3/2023 | Chalkley et al. |
| 2023/0102889 | A1 | 3/2023 | Keiter et al. |
| 2023/0114684 | A1 | 4/2023 | Jakobsson et al. |
| 2023/0119641 | A1 | 4/2023 | Meyers et al. |
| 2023/0124040 | A1* | 4/2023 | Quigley ................ G06F 21/602 705/65 |
| 2023/0130182 | A1 | 4/2023 | Mir et al. |
| 2023/0135947 | A1* | 5/2023 | Barhudarian ............. H04L 9/30 726/26 |
| 2023/0137867 | A1* | 5/2023 | Walters ................. H04L 9/3297 705/75 |
| 2023/0139878 | A1 | 5/2023 | Clark et al. |
| 2023/0222467 | A1 | 7/2023 | Wang et al. |
| 2023/0315819 | A1 | 10/2023 | Guy et al. |
| 2023/0316280 | A1 | 10/2023 | Sardari et al. |
| 2023/0351347 | A1* | 11/2023 | Damrow ................ G06Q 20/36 |
| 2023/0368184 | A1 | 11/2023 | Polasa et al. |
| 2024/0012915 | A1* | 1/2024 | Andon ................. A43B 1/0072 |
| 2024/0020624 | A1* | 1/2024 | Williams .............. H04L 9/3213 |
| 2024/0031153 | A1 | 1/2024 | Dravneek et al. |
| 2024/0070660 | A1 | 2/2024 | Milne et al. |
| 2024/0104521 | A1 | 3/2024 | Azgad-Tromer et al. |

FOREIGN PATENT DOCUMENTS

| | | | |
|---|---|---|---|
| KR | 2196001 | B1 | 12/2020 |
| WO | WO-2021/041746 | A1 | 3/2021 |
| WO | WO-2023/034423 | A1 | 3/2023 |

OTHER PUBLICATIONS

Madine M, Salah K, Jayaraman R, Battah A, Hasan H, Yaqoob I. Blockchain and NFTs for time-bound access and monetization of private data. Ieee Access. Sep. 5, 2022;10:94186-202. (Year: 2022).*

Xhashtag, “Introducing #Selena—The First Liquid NFT Collection on Solana,” Sep. 22, 2021, downloaded Sep. 13, 2022, https://medium.com/xhashtag/introducing-selena-the-first-liquid-nft-collection-on-solana-da568f6311d5.

Dietrich et al., Classification Model Of Supply Chain Events Regarding Their Transferability To Blockchain Technology.

Globe Newswire, “The Stoned Ape Crew NFT Evolution is Live!,” (Jan. 26, 2022), https://www.globenewswire.com/en/news-release/2022/01/26/2373679/0/en/The-Stoned-Ape-Crew-NFT-Evolution-is-Live.html, pp. 1-4.

Gupta et al., “NFTs and the Cryptoverse,” (Sep. 25, 2021), https://www.cryptechie.com/p/nft, pp. 1-23.

Ismail et al., TRABAC: A Tokenized Role-Attribute Based Access Control using Smart Contract for Supply Chain Applications.

Johnson et al., Creating Generative Art NFTs from Genomic Data.

La Fountain et al., “Non-Fungible Tokens, Libraries, and Publishers,” (Jul./Aug. 2021), https://www.infotoday.com/OnlineSearcher/Articles/Features/NonFungible-Tokens-Libraries-and- Publishers-147856.shtml, pp. 1-5.

Raza et al., “Wells Fargo To Launch Digital Asset For Internal Transactions,” (Sep. 18, 2019), https://insidebitcoins.com/news/wells-fargo-to-launch-digital-asset-for-internal-transactions, pp. 1-4.

Tahtacioglu et al., NFT with Chainlink Oracle—Blockchain Roadmap.

Investopedia, “Blockchain Explained,” 2021, The Wayback Machine, pp. 1-29.

Investopedia, Blockchain Explained, Sep. 5, 2021, https://web.archive.org/web/20210905101727/https://www.investopedia.com/terms/b/blockchain.asp (Year: 2021).

Noura Alnuaimi, NFT Certificates and Proof of Delivery for Fine Jewelry and Gemstones, Sep. 2022, IEEE, https:// ieeexplore.ieee.org/stamp/stamp.jsp'?tp=&arnumber=9899445 (Year: 2022).

* cited by examiner

300

700

DIVIDING NON-FUNGIBLE TOKENS TO DIVIDE RESTRICTED OUTPUT OF CONTENT OBJECTS

TECHNICAL FIELD

The present implementations relate generally to electronic content delivery, and more particularly to dividing non-fungible tokens (NFTs) to divide restricted output of content objects.

INTRODUCTION

Transmitting content from one location to another can subject that content to increasing risk of unauthorized interception. As demands on volume and rate of data transmissions increases, restrictions on request for data that focus transmission efficiently to authorized sources and systems is increasingly desired.

SUMMARY

Aspects of technical solution are directed to dividing NFTs and content controlled by NFTs. This technical solution can transfer control of assets linked with NFTs transparently to the request entity system having control of the NFT, and thus, a restricted content object linked with the NFT. The technical solution can include a smart contract including a control structure to divide both an NFT and a content object linked with the NFT, and to generate one or more transformed smart contracts controlling new NFTs minted to correspond to a division of a primary NFT. Thus, an NFT can be divided into a plurality of newly minted NFTs, and the content objects can be corresponding divided in accordance with any predetermined criteria for allocation. For example, an NFT controlling a particular number of shares of a financial equity can be provided as input to a smart contract control structure that mints a plurality of NFTs based on a percentage allocation to one or more parties. This technical solution can provide at least a system architecture and a control structure of a smart contract to execute transaction to transfer control of portions of an NFT and portions of a content object controlled by the NFT. A technological solution for dividing NFTs to divide restricted output of content objects is provided.

At least one aspect is directed to a system to transmit portions of output of a non-fungible token (NFT) to multiple remote devices. The system can include memory and one or more processors. The system can generate, based on a first content object, a first non-fungible token (NFT) including a link with the first content object and compatible with a first control structure that restricts a first output of the first content object to a first remote device remote from the processor. The system can divide, in response to a request to modify the first content object, the first content object into a second content object and a third content object. The system can generate, based on the second content object, a second NFT including a link with the second content object and compatible with a second control structure that restricts a second output of the second content object to the first remote device remote from the processor. The system can generate, based on the third content object, a third NFT including a link with the third content object and with a third control structure that restricts a third output of the third content object to a second remote device remote from the processor. The system can transmit, by the second control structure, the second output to the first remote device. The system can transmit, by the third control structure, the third output to the second remote device.

At least one aspect is directed to a method to transmit portions of output of a non-fungible token (NFT) to multiple remote devices. The method can include generating, based on a first content object, a first non-fungible token (NFT) can include a link with the first content object and compatible with a first control structure that restricts a first output of the first content object to a first remote device remote from the processor. The method can include dividing, in response to a request to modify the first content object, the first content object into a second content object and a third content object. The method can include generating, based on the second content object, a second NFT can include a link with the second content object and compatible with a second control structure that restricts a second output of the second content object to the first remote device. The method can include generating, based on the third content object, a third NFT can include a link with the third content object and compatible with a third control structure that restricts a third output of the third content object to a second remote device remote from the processor. The method can include transmitting, by the second control structure, the second output to the first remote device. The method can include transmitting, by the third control structure, the third output to the second remote device.

At least one aspect is directed to a computer readable medium can include one or more instructions stored thereon and executable by a processor for transmitting portions of output of a non-fungible token (NFT) to multiple remote devices. The computer readable medium can generate, by the processor and based on a first content object, a first non-fungible token (NFT) can include a link with the first content object and compatible with a first control structure that restricts a first output of the first content object to a first remote device remote from the processor. The computer readable medium can divide, by the processor and in response to a request to modify the first content object, the first content object into a second content object and a third content object. The computer readable medium can generate, by the processor and based on the second content object, a second NFT can include a link with the second content object and compatible with a second control structure that restricts a second output of the second content object to the first remote device. The computer readable medium can generate, by the processor and based on the third content object, a third NFT can include a link with the third content object and compatible with a third control structure that restricts a third output of the third content object to a second remote device remote from the processor. The computer readable medium can transmit, by the processor via the second control structure, the second output to the first remote device. The computer readable medium can transmit, by the processor via the third control structure, the third output to the second remote device.

BRIEF DESCRIPTION OF THE DRAWINGS

These and other aspects and features of the present implementations will become apparent to those ordinarily skilled in the art upon review of the following description of specific implementations in conjunction with the accompanying figures, where.

DETAILED DESCRIPTION

Figure 1:
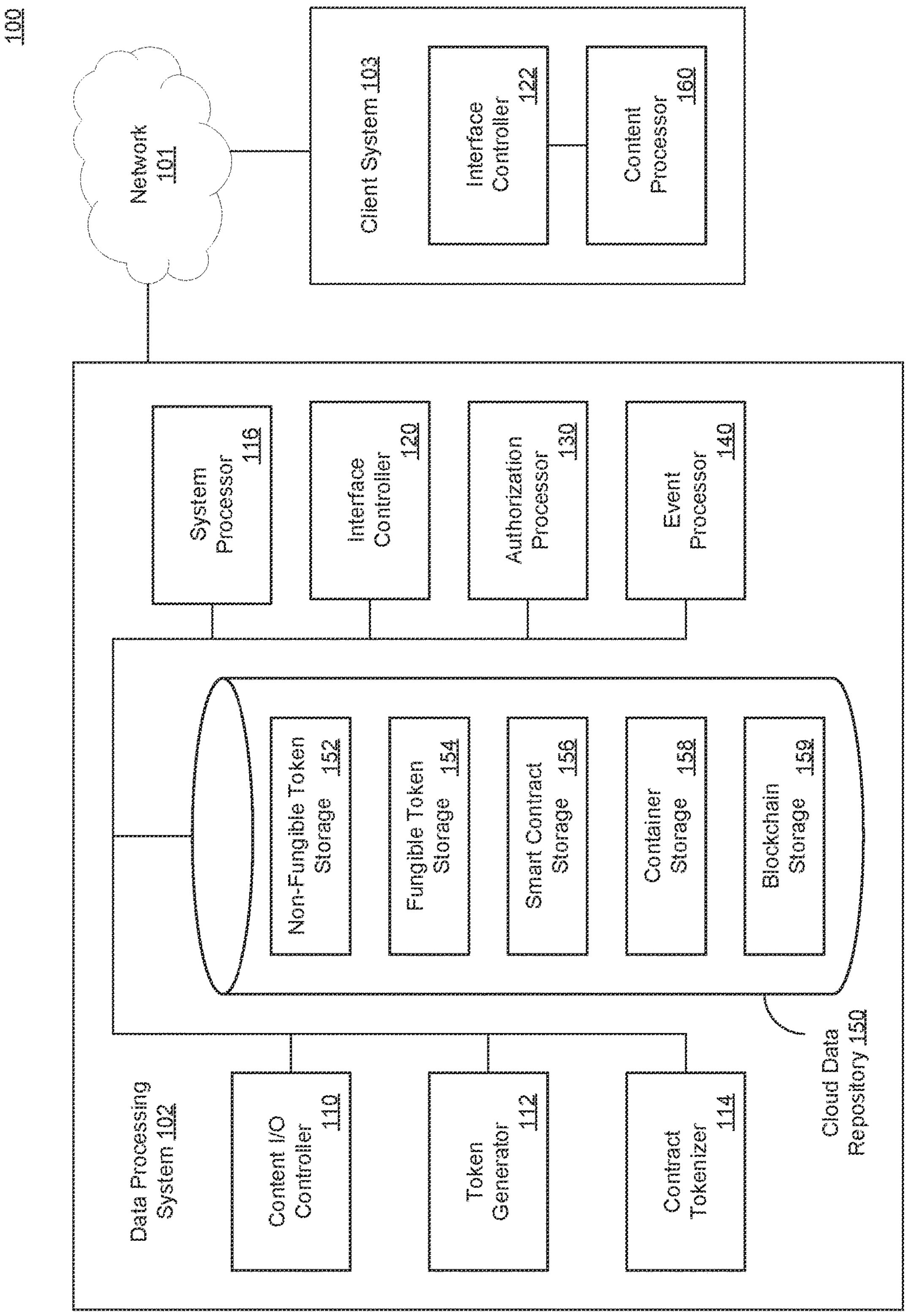
FIG. 1 illustrates a system in accordance with present implementations.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

This technical solution can include an architecture to transparently divide or apportion a content object controlled by an NFT, and to generate corresponding control structures including smart contracts and NFTs to restrict output of modified or generated content objects in accordance with predetermined parameters governing the modification or generation of the content objects. For example, this technical solution can generate two NFTs and two smart contract control structures in response to request via a transform token to divide a primary content object into two content objects. An architecture can generate two new content objects each having a particular portion of the primary content object, and can link the content object to a corresponding NFT. The architecture can then include each NFT in its corresponding smart contract, to restrict output by the content object to input by one or more tokens distinct from the NFT linked with the content object. Thus, the primary NFT, and any transformed NFTs minted in response to a division of the primary NFT, can each be securely maintained with significantly reduced risk of loss of control of any NFT in connection with a partial transfer of control of a content object linked with the NFT. For example, the architecture can include a secure NFT maintained at a secure system to restrict transactions of a smart contract to a particular environment local to the secure NFT. A partial transfer can include, for example, a sale of a portion of a financial equity position including multiple shares of a financial equity or multiple shares of multiple types of financial equities.

FIG. 1 illustrates a system in accordance with present implementations. As illustrated by way of example in FIG. 1, an example system 100 can include a network 101, a data processing system 102, and a client system 103. The network 101 can be any type or form of network. The geographical scope of the network 101 can vary widely and the network 101 can be a body area network (BAN), a personal area network (PAN), a local-area network (LAN), e.g. Intranet, a metropolitan area network (MAN), a wide area network (WAN), or the Internet. The topology of the network 101 can be of any form and can include, e.g., any of the following: point-to-point, bus, star, ring, mesh, or tree. The network 101 can be an overlay network which is virtual and sits on top of one or more layers of other networks 101. The network 101 can be of any such network topology as known to those ordinarily skilled in the art capable of supporting the operations described herein. The network 101 can utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPv6), or the link layer. The network 101 can be a type of a broadcast network, a telecommunications network, a data communication network, or a computer network. The data processing system 102 can include a content input and output (I/O) controller 110, a token generator 112, a contract tokenizer 114, a system processor 116, an interface controller 120, an authorization processor 130, an event processor 140, and a cloud data repository 150. The client system 103 can include a computing system located remotely from the data processing system 102. The client system 103 can include an interface controller 122 and a content processor 160.

The content I/O controller 110 can obtain one or more content objects. The content I/O controller 110 can communicate with one or more external systems via the network 101, and can obtain one or more contents objects via the network 101. The content I/O controller 110 can generate content objects based on one or more output criteria that can be transmitted to a computing device, including, for example, the client system 103. The content I/O controller 110 can identify one or more characteristics of a content object. A characteristic can include, for example, a data type, an output data type, an input data type, or any combination thereof. For example, the content I/O controller 110 can obtain and identify contents objects including video, audio, text, any media, executable programs, or any combination thereof. The content I/O controller 110 can transmit one or more of content objects or references or links with one or more content objects to the token generator 112.

The token generator 112 can generate one or more non-fungible tokens linked with particular content objects obtained from the content I/O controller 110. The token generator 112 can generate a token corresponding to a particular content object or content objects. The token generator 112 can obtain a preexisting token and can assign the preexisting token to a particular content object or content objects. The token generator 112 can generate a non-fungible token that is unique against all other tokens generated by the token generator 112 to identify content objects, a fungible token that can be generated or replicated an arbitrary number of times, and a semi-fungible token that can be generated or replicated a particular number of times below or meeting a particular replication threshold. One or more fungible tokens or semi-fungible tokens can, for example, be associated with a particular content object or the same content object. The token generator 112 can access the fungible token storage 154 to determine whether the replication threshold corresponding to a particular threshold is satisfied, and can block or forgo generation or replication of a token beyond or meeting the replication threshold in response to a determination that the replication threshold corresponding to a particular threshold is satisfied. The token generator 112 can transmit one or more of content objects or references or links with one or more content objects to the contract tokenizer 114, and can transmit one or more non-fungible tokens, fungible token, or semi-fungible tokens to the contract tokenizer 114.

The contract tokenizer 114 can generate one or more smart contracts that are executable to restrict output of one or more particular content objects based on one or more content objects. The system processor, for example, can execute smart contracts generated by the contract tokenizer 114. The contract tokenizer 114 can obtain one or more content objects and can generate a container corresponding to the content objects. For example, the contract tokenizer 114 can generate a container to encapsulate a plurality of content objects each associated with a particular content characteristic. The container can restrict access to the content objects within the container, by an encapsulation layer that, for example, encrypts all content objects within the container with a common encryption scheme. The encapsulation layer can control output of multiple content objects within the container by uniformly and concurrently decrypting the content objects according to the common encryption scheme. A content characteristic can include a type of output, a magnitude associated with the output, or any combination thereof, for example. For example, the content characteristic can include a periodic value increase in a metric of the content object, or can include a medic type associated with a media object. A media type can include, for example, video, audio, text, or any combination thereof. The contract tokenizer 114 can store one or more containers can encapsulating one or more content objects in the container storage 158.

The contract tokenizer 114 can generate a smart contract based on one or more tokens and containers. The contract tokenizer 114 can generate a smart contract including one or more executable instructions to restrict or transmit output of cone or more content objects encapsulated within a particular container. The contract tokenizer 114 can generate a smart contract that can conditionally transmit output of one or more of the content objects in response to detection of one or more tokens. The tokens can include one or more non-fungible token, fungible tokens, and semi-fungible tokens. The contract tokenizer 114 can store the smart contract to the smart contract storage 156, and can link a token to the smart contract. The contract tokenizer 114 can publish, post, or append, for example, the token linked with the smart contract to a blockchain, and can publish, post, or append, for example, one or more tokens corresponding to the smart contract to a blockchain.

The system processor 116 can execute one or more instructions associated with the system 100. The system processor 116 can include an electronic processor, an integrated circuit, or the like including one or more of digital logic, analog logic, digital sensors, analog sensors, communication buses, volatile memory, nonvolatile memory, and the like. The system processor 116 can include, but is not limited to, at least one microcontroller unit (MCU), microprocessor unit (MPU), central processing unit (CPU), graphics processing unit (GPU), physics processing unit (PPU), embedded controller (EC), or the like. The system processor 116 can include a memory operable to store or storing one or more instructions for operating components of the system processor 116 and operating components operably coupled to the system processor 116. The one or more instructions can include at least one of firmware, software, hardware, operating systems, embedded operating systems, and the like. The system processor 116 or the system 100 generally can include at least one communication bus controller to effect communication between the system processor 116 and the other elements of the system 100.

The interface controller 120 can link the data processing system 102 with one or more of the network 101 and the client system 103 by one or more communication interfaces. A communication interface can include, for example, an application programming interface ("API") compatible with a particular component of the data processing system 102 or the data processing system 102. The communication interface can provide a particular communication protocol compatible with a particular component of the data processing system 102 and a particular component of the client system 103. The interface controller 120 can be compatible with particular content objects, and can be compatible with particular content delivery systems corresponding to particular content objects. For example, the interface controller 120 can be compatible with transmission of video content, audio content, or any combination thereof. For example, the interface controller 120 can be compatible with payment processing transmissions by a protocol compatible with payment processing latency and encryption structures.

The authorization processor 130 can validate one or more tokens against one or more smart contracts. The authorization processor 130 can obtain one or more tokens, and can compare one or more token to one or more tokens requested by a particular smart contract. The authorization processor 130 can detect whether a particular token is compatible with a particular smart contract by detecting whether a particular token matches a particular token characteristic associated with a particular smart contract. For example, the authorization processor 130 can detect that a token is compatible with a smart contract based on comparing a hash of the token with a hash included in the smart contract. The authorization processor 130 can generate an authorization indication based on one or more determinations, and can transmit the authorization indication to the event processor 140. The authorization processor 130 can, for example, provide a container or one or more content objects to the event processor 140, in response to the authorization indication, by decrypting the encapsulation layer of the container. The authorization processor 130 can, for example, execute the smart contract with the compatible tokens to retrieve a particular container for the smart contract, or a reference to the particular container, from the container storage 158.

The event processor 140 can execute one or more actions in response to an authorization indication generated by the authorization processor 140. The event processor 140 can, for example, provide output from particular content objects within a particular container, in response to receiving a container or reference to a container from the authorization processor 130.

The cloud data repository 150 can store data associated with the system 100. The cloud data repository 150 can include one or more hardware memory devices to store binary data, digital data, or the like. The cloud data repository 150 can include one or more electrical components, electronic components, programmable electronic components, reprogrammable electronic components, integrated circuits, semiconductor devices, flip flops, arithmetic units, or the like. The cloud data repository 150 can include at least one of a non-volatile memory device, a solid-state memory device, a flash memory device, and a NAND memory device. The cloud data repository 150 can include one or more addressable memory regions disposed on one or more physical memory arrays. A physical memory array can include a NAND gate array disposed on, for example, at least one of a particular semiconductor device, integrated circuit device, and printed circuit board device. The cloud data repository 150 can include a non-fungible token storage 152, a fungible token storage 154, a smart contract storage 156, a container storage 158, and a blockchain storage 159.

The non-fungible token storage 152 can store one or more NFTs and corresponding addresses for particular NFTs that indicate links with the corresponding NFT. The non-fungible token storage 152 can include NFTs associated with the data processing system 102 or any component thereof, the client system 103 or any component thereof, any content object, or any combination thereof. The fungible token storage 154 can store one or more fungible tokens and semi-fungible tokens. The fungible token storage 154 can store corresponding addresses for particular fungible tokens that indicate links with the corresponding fungible tokens, and can store corresponding addresses for particular semi-fungible tokens that indicate links with the corresponding semi-fungible tokens. The non-fungible token storage 152 can include fungible tokens and semi-fungible tokens associated with the data processing system 102 or any component thereof, the client system 103 or any component thereof, any content object, or any combination thereof.

The smart contract storage 156 can store one or more smart contracts and corresponding addresses for particular smart contracts that indicate links with the corresponding smart contracts. The container storage 158 can store one or more containers and their contained content objects and corresponding addresses for particular containers that indicate links with the corresponding containers. The blockchain storage 159 can store one or more blockchains linked with one or more smart contracts, tokens, containers, or content objects, by corresponding addresses for particular smart contracts, tokens, containers, or content objects that indicate links with a particular blockchain.

The interface controller 122 can link the client system 103 with one or more of the network 101 and the data processing system 102 by one or more communication interfaces. A communication interface can include, for example, an application programming interface ("API") compatible with a particular component of the data processing system 102 or the data processing system 102. The communication interface can provide a particular communication protocol compatible with a particular component of the data processing system 102 and a particular component of the client system 103. The interface controller 120 can be compatible with particular content objects, and can be compatible with particular content delivery systems corresponding to particular content objects. For example, the interface controller 120 can be compatible with transmission of video content, audio content, or any combination thereof. For example, the interface controller 120 can be compatible with payment processing transmissions by a protocol compatible with payment processing latency and encryption structures. The communication interface of the client system 103 can be compatible with the communication interface of the data processing system 102 to perform unidirectional or bidirectional communication between the interface controllers 120 and 122.

The content processor 160 can execute one or more actions in response to an authorization indication generated by the authorization processor 140. The content processor 160 can, for example, receive output from particular content objects within a particular container, in response to receiving transmission by the interface controller 122 based on a container or reference to a container.

Figure 2:
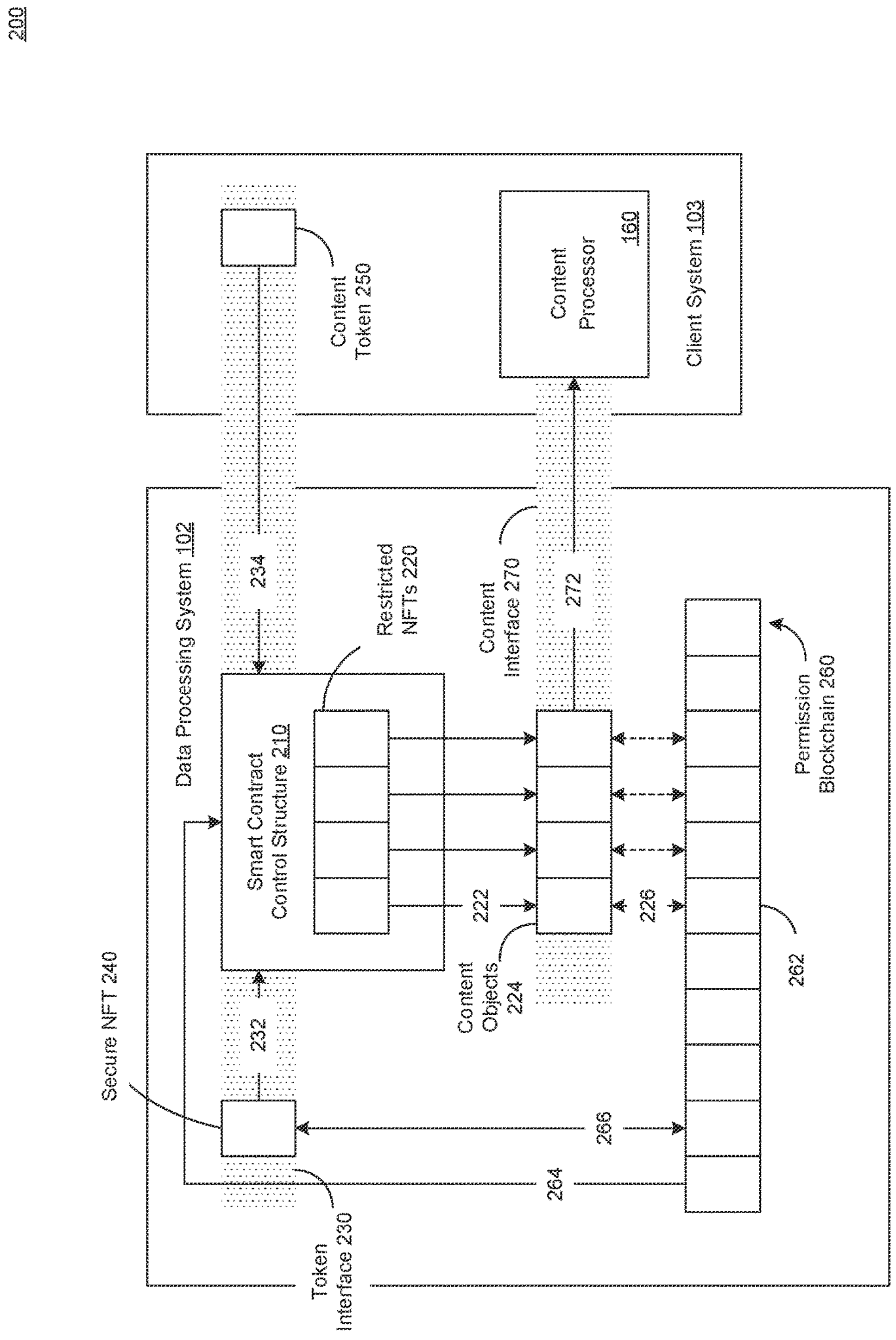
FIG. 2 illustrates an architecture in accordance with present implementations.

FIG. 2 illustrates an architecture in accordance with present implementations. As illustrated by way of example in FIG. 2, an example architecture 200 can include the data processing system 102 and the client system 103. The architecture 200 can include the content processor 160, a smart contract control structure 210, one or more restricted NFTs 220, one or more content links 222, one or more content objects 224, one or more blockchain links 226, a token interface 230, a security link 232, a client link 234, a secure NFT 240, a content token 250, a permission blockchain 260 with one or more blocks 262, a control link 264, a secure NFT link 266, a content interface 270, and a content link 272. A link as discussed herein can correspond to or include metadata. The metadata can, for example, be stored within or integrated with any smart contract, smart contract control structure, content object, block, blockchain, or any combination thereof.

The smart contract control structure 210 can include one or more instructions to restrict and transmit output of one or more of the content objects 224. The smart contract control structure 210 can correspond to an executable smart contract and can include a gateway component. The gateway component can include one or more instructions to restrict or prevent access to the restricted NFTs 220 in the absence of presence of one or more tokens compatible with the smart contract control structure 210. The smart contract control structure 210 can include an encapsulation layer that, for example, maintains the restricted NFTs in an encrypted state. The smart contract control structure 210 can permit access to the restricted NFTs based on a private key, for example, compatible with the encapsulation layer and operable to decrypt the encryption corresponding to the encapsulation layer. The gateway component can be compatible with and interface with the token interface 230, and the encapsulation layer can be integrated with the smart contract control structure 210.

The restricted NFTs 220 can each include a particular NFT and can correspond to particular content objects. A restricted NFT can be associated with a particular content object, and can be required to transmit output of the content object, transfer the content object to another storage location, or any combination thereof, for example. Each of the restricted NFTs 220 can indicate control of a particular content object of the content objects 224 by a corresponding content link of the content links 222. The content links 222 can include a reference, pointer, or the like, to or between each restricted NFT and each content object associated with that particular restricted NFT.

The content objects 224 can each include a particular data or instructions. A content objects can correspond to a collections of executable instructions or data that can be finite. For example, a content object can include a video file corresponding to a limited number of instances of video content. For example, a content object can include an audio file corresponding to a limited number of instances of audio content. For example, a content object can include a metric that increases with limited capacity, such as a physical measurement a financial instrument valuation, a periodic output based on a physical or scarce property, or any combination thereof.

The token interface 230 can include a communication channel between one or more of the smart contract control structure 210, the secure NFT at the data processing system 102, and the content token 250 at the client system 103. The token interface 230 can include an application programming interface compatible with the smart contract control structure 210 to detect the secure NFT at the data processing system 102, and the content token 250 at the client system 103. At least the token interface 230 or the smart contract control structure 210 can execute one or more instructions to determine whether one or more of the secure NFT 240 and the content token 250 are compatible with the smart contract control structure 210. The security link 232 can include a transmission path or communication path between the secure NFT 240 and the smart contract control structure 210 by the token interface 230. At least the token interface 230 or the smart contract control structure 210 can detect the secure NFT 240 via the security link 232. The client link 234 can include a transmission path or communication path between the content token 250 and the smart contract control structure 210 by the token interface 230. At least the token interface 230 or the smart contract control structure 210 can detect the content token 250 via the client link 234.

The secure NFT 240 can include an NFT associated with and controlled by the data processing system 102. Transmission of the secure NFT 240 can be restricted by the data processing system 102 to within the data processing system 102. For example, the secure NFT 240 can correspond to a "backup key" or "house key" that must be detected in order to the smart contract control structure 210 transmit output of the content objects 224 corresponding to the restricted NFTs 220. Thus, the secure NFT 240 can restrict authorization by the smart contract control structure 210 to the data processing system 102 environment. The content token 250 can include a token associated with and controlled by the client system 103. The content token 250 can include a fungible token or a semi-fungible token. For example, the content token 250 can include a fungible token to obtain output of a collection of freely accessible content objects 224. For example, the content token 250 can include a semi-fungible token to obtain output of a collection of content objects 224 accessible under limited conditions. Limited conditions can include content objects accessible by subscription. Transmission of the content token 250 can be restricted by the client system 103 to within the data processing system 102.

The permission blockchain 260 can include at least one blockchain including one or more of the blocks 262. The permission blockchain 260 can be linked with one or more content objects 224, secure NFTs 240, and smart contract control structures 210. The permission blockchain 260 can include a blockchain operated and controlled at the data processing system 102. The permission blockchain 260 can include a plurality of blockchains each corresponding to particular aspects of the links associated with the corresponding blockchains. The blocks 262 can include or store links to one or more objects associated with the blockchain. The blockchain links 226 can include a reference, pointer, or the like, to or between a block among the blocks 262 and a content object associated with that particular block. The control link 264 can include a reference, pointer, or the like, to or between a block among the blocks 262 and the smart contract control structure 210 associated with that particular block. The secure NFT link 266 can include a reference, pointer, or the like, to or between a block among the blocks 262 and the secure NFT 240 associated with that particular block.

The content interface 270 can include a communication channel between one or more of the content objects 224 at the data processing system 102, and the content processor 160 at the client system 103. The content interface 270 can include an application programming interface compatible with the content objects 224 to transmit data or instructions based on the content objects 224 to the content processor 160 of the client system 103. At least the content interface 270 or the content processor 160 can execute one or more instructions to obtain output of the content objects 224. The content link 272 can include a transmission path or communication path between the content objects 224 and the content processor 160 by the content interface 270. At least the content interface 270 or the content processor 160 can obtain output of the content objects 224 via the content link 272.

Figure 3:
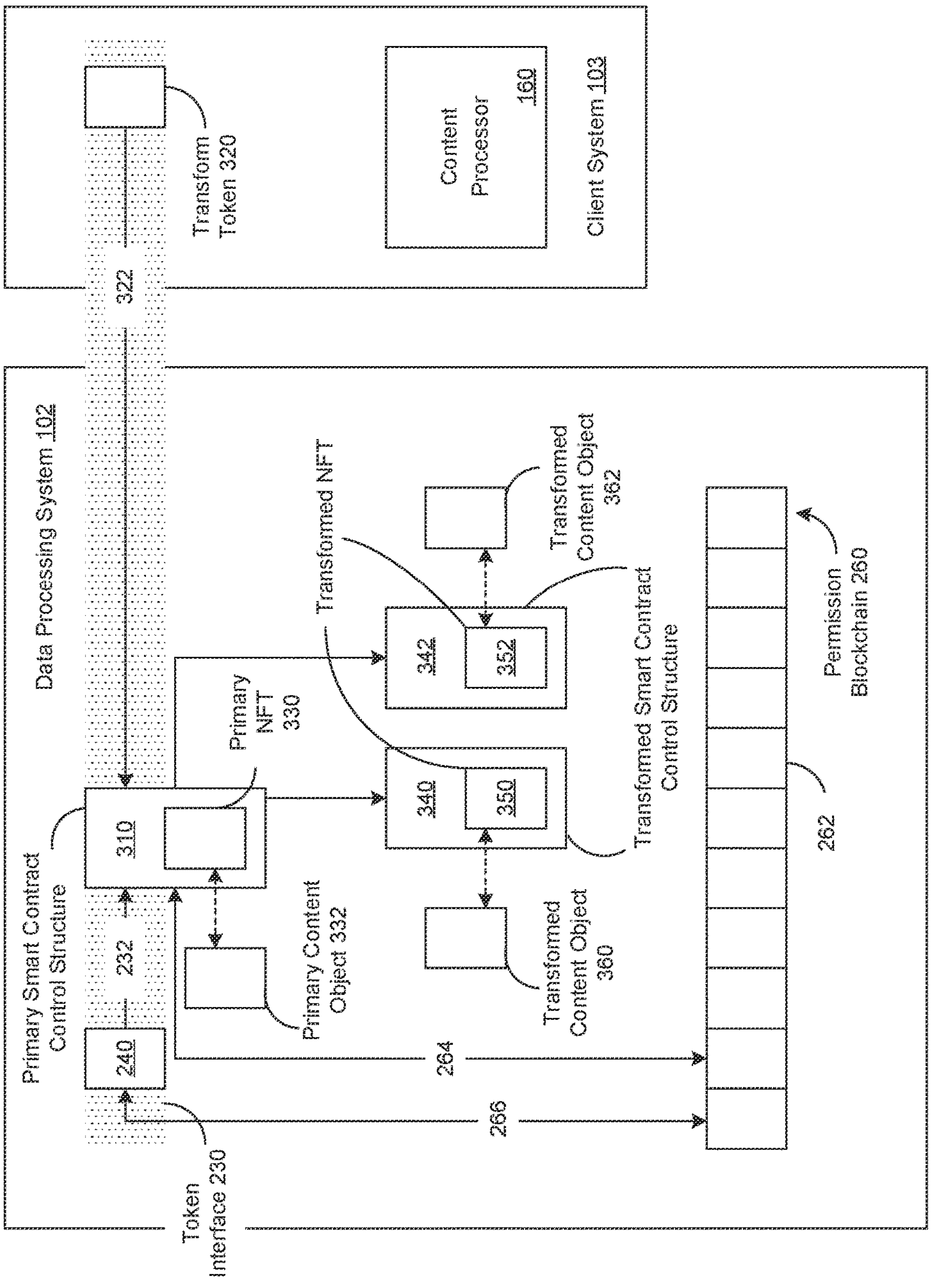
FIG. 3 illustrates an architecture to transform an NFT and a content object linked with the NFT, in accordance with present implementations.

FIG. 3 illustrates an architecture to transform an NFT and a content object linked with the NFT, in accordance with present implementations. As illustrated by way of example in FIG. 3, an example architecture 300 can include the data processing system 102 and the client system 103. The data processing system 102 can include the token interface 230, the security link 232, the secure NFT 240, the permission blockchain 260 with the blocks 262, the control link 264, the secure NFT link 266, a primary smart contract control structure 310, a primary NFT 330, a primary content object 332, transformed smart contract control structures 340 and 342, transformed NFTs 350 and 352, and transformed content objects 360 and 362. The client system 103 can include a transform token 320 and a client link 322.

The primary smart contract control structure 310 can include one or more instructions to generate or modify one or more smart contract control structures, NFTs, and content objects. The primary smart contract control structure 310 can correspond to an executable smart contract and can include a gateway component. The gateway component can include one or more instructions to restrict or prevent execution of the primary smart contract control structure 310 in the absence of presence of one or more tokens compatible with the primary smart contract control structure 310. The primary smart contract control structure 310 can generate or modify one or more of the transformed smart contract control structures 340 and 342 based on a detection of presence of the transform token 320. For example, based on parameters obtained from the transform token 320, the primary smart contract control structure 310 can generate the transformed NFTs 350 and 352 from the primary NFT 330, and can generate the transformed content objects 360 and 362 from the primary content object 332.

The transform token 320 can include an NFT, a fungible token or a semi-fungible token. For example, the transform token 320 can include an NFT that identifies one or more transform parameters related to the primary content object 332. For example, transform parameters can include a proportion for diving the content object into two content objects, a magnitude value corresponding to a content object to be generated based on the content object, a temporal restriction including a part of a temporal restriction corresponding to the primary content object 332, or any combination thereof. For example, the transform token 320 can include a proportion to divide the primary NFT 330 controlling the primary content object 332 comprising a particular number of shares of a financial equity or financial instrument, into a plurality of transformed NFTs controlling a plurality of content objects each having a particular reduced number of shares summing to the shares of the primary content object 332. The client link 322 can include a transmission path or communication path between the transform token 320 and the primary smart contract control structure 310 by the token interface 230. At least the token interface 230 or the primary smart contract control structure 310 can detect the transform token 320 via the client link 322. For example, the transform token 320 can be generated at the client system 103 in response to an indication from a user interface thereof to conduct a sale of a portion of an NFT controlled by a customer account authenticated to the client system 103.

The primary NFT 330 can include an NFT corresponding to or controlling the primary content object 332. The primary NFT 330 can correspond to an NFT generated or "minted" by an originating system corresponding to a creator of the primary content object 332. For example, the primary NFT 330 can correspond to a particular NFT indicating ownership of a particular set of or number of shares of a financial equity or financial instrument, and can be generated or minted by a financial institution or a computing system corresponding to a financial institution. For example, the data processing system 102 can generate the primary NFT 330 and the primary content object 332 in response to an order by a client device linked with a customer account of the financial institution to purchase a particular number of shares. For example, the primary NFT 330 can include a temporal aspect indicating that ownership of the primary content object 332 or authorization to obtain output of the primary content object 332 during a particular time period defined with respect to or bounded by one or more timestamps. For example, a primary NFT 320 can include a timestamp that indicates a time at which output of the primary content object 332 is restricted or blocked, or ceases to be restricted or blocked. A plurality of such timestamps can identify one or more time periods with a beginning and an end of any restriction, for example.

The primary content object 332 can include a data structure corresponding to a particular content controlled by the primary NFT 330. For example, the primary content object 332 can have one or more aspects or parameters that are divisible or assignable to multiple entities. For example, the primary content object 332 can include a data structure identifying or linking to particular share of a financial equity or financial instrument, where each share can be individually assignable to a particular customer account linked with the financial institution. For example, the primary content object 332 can include a plurality of fungible or semi-fungible assets, or links thereto. The primary content object 332 can include an aspect divisible and assignable to multiple owners that is extrinsic to the primary content object 332. For example, the primary content object 332 can include or link to a non-fungible asset that can have ownership divided among multiple entities or ownership divided among multiple time periods, for example. For example, the primary content object 332 can be linked with a non-fungible instance of art, real estate, or membership right.

The transformed smart contract control structures 340 and 342 can correspond in one or more of structure and operation to the primary smart contract control structure 310, and be generated based on the transform token 320. The primary smart contract control structure 310 can generate the transformed smart contract control structures 340 and 342 in response to an instruction or value of the transform token 320 that identifies a particular number of divisions of the primary content object 332. In response to obtaining the particular number of divisions, the primary smart contract control structure 310 can generate a number of the transformed smart contract control structures 340 and 342 corresponding to the particular number of divisions. For example, the transform token 320 can include a data structure indicating a split of the primary content object 332 into two content objects each respectively having 75% and 25% of the value of the primary content object 332. In response, the primary smart contract control structure 310 can generate the two transformed smart contract control structures 340 and 342 to match the number of content objects requested in the transform token 320.

The transformed NFTs 350 and 352 can correspond in one or more of structure and operation to the primary NFT 330, and be generated based on the transform token 320. The primary smart contract control structure 310 can generate the transformed NFTs 350 and 352 in response to an instruction or value of the transform token 320 that identifies a particular number of divisions of the primary content object 332. In response to obtaining the particular number of divisions, the primary smart contract control structure 310 can generate a number of the transformed NFTs 350 and 352 corresponding to the particular number of divisions. For example, the transform token 320 can include a data structure indicating a split of the primary content object 332 into two content objects each respectively having 75% and 25% of the value of the primary content object 332. In response, the primary smart contract control structure 310 can generate the two transformed NFTs 350 and 352 to match the number of content objects requested in the transform token 320. The primary smart contract control structure 310 can embed each of the transformed NFTs 350 and 352 in a respective one or more the transformed smart contract control structures 340 and 342.

The transformed content objects 360 and 362 can correspond in one or more of structure and operation to the primary content object 332, and be generated based on the transform token 320. The primary smart contract control structure 310 can generate the transformed content objects 360 and 362 in response to an instruction or value of the transform token 320 that identifies a transform metric corresponding to one or more of a particular number of divisions of the primary content object 332, a proportional division of the primary content object 332, a discrete value of one or more content objects to be generated based on the primary content object 332, or any combination thereof.

In response to obtaining the transform metric, the primary smart contract control structure 310 can generate a number of the transformed NFTs 350 and 352 corresponding to the transform metric and having a characteristic corresponding to the transform metric. For example, the transform token 320 can include a data structure indicating a split of the primary content object 332 into two content objects each respectively having 75% and 25% of the shares of the primary content object 332. In response, the primary smart contract control structure 310 can generate the two transformed content objects 360 and 362 to each respectively include 75 shares and 25 shares out of 100 shares of the primary content object 332, based on the transform metric of the transform token 320. The primary smart contract control structure 310 can link each of the transformed content objects 360 and 362 with the transformed NFTs 350 and 352 in a respective one of the transformed smart contract control structures 340 and 342.

The transformed content objects 360 and 362 can generate output in accordance with the transform metric and intrinsic characteristics of each of the transformed content objects 360 and 362. For example, the transformed content objects 360 and 362 can include a characteristic to generate a particular output on condition of a particular time, time period, or any combination thereof. For example, a primary content object can correspond to a financial equity generating a periodic payment processing output corresponding to a dividend payment. Each of the transformed content objects 360 and 362 can obtain the characteristic corresponding to the period payment processing action from the primary content object 332. Thus, for example, the transformed content object 360 can output 75% of a dividend payment processing instruction having 75% of a value of a dividend payment processing instruction of a primary content object 332. Correspondingly, the transformed content object 362 can output 25% of a dividend payment processing instruction having 25% of a value of a dividend payment processing instruction of a primary content object 332. The system can generate, by the second content object, the second output including a first value aggregated over a first time period. The system can generate, by the third content object, the third output including a second value aggregated over a second time period subsequent to the first time period. The first output can include a third value aggregated over the first time period and the second time period. The system can generate, by the second content object, the second output based on a size of the second content object. The system can generate, by the third content object, the third output based on a size of the third content object. The first output can have a first magnitude, the second output having a second magnitude corresponding to a proportion between the first magnitude and the second magnitude, and the third output having a third magnitude corresponding to a proportion between the first magnitude and the third magnitude.

The system can detect, by the first control structure, the first NFT and a fourth NFT linked with the processor. The system can validate, in response to the detection by the first control structure, the request to modify the first content object. The system can detect, by the second control structure, the second NFT and a fourth NFT linked with the processor. The system can transmit, by the second control structure in response to the detection by the second control structure, the second output to the first remote device. The system can detect, by the third control structure, the third NFT and a fourth NFT linked with the processor. The system can transmit, by the third control structure in response to the detection by the third control structure, the third output to the second remote device. The first control structure can include a first smart contract, the second control structure can include a second smart contract, and the third control structure can include a third smart contract.

Figure 4:
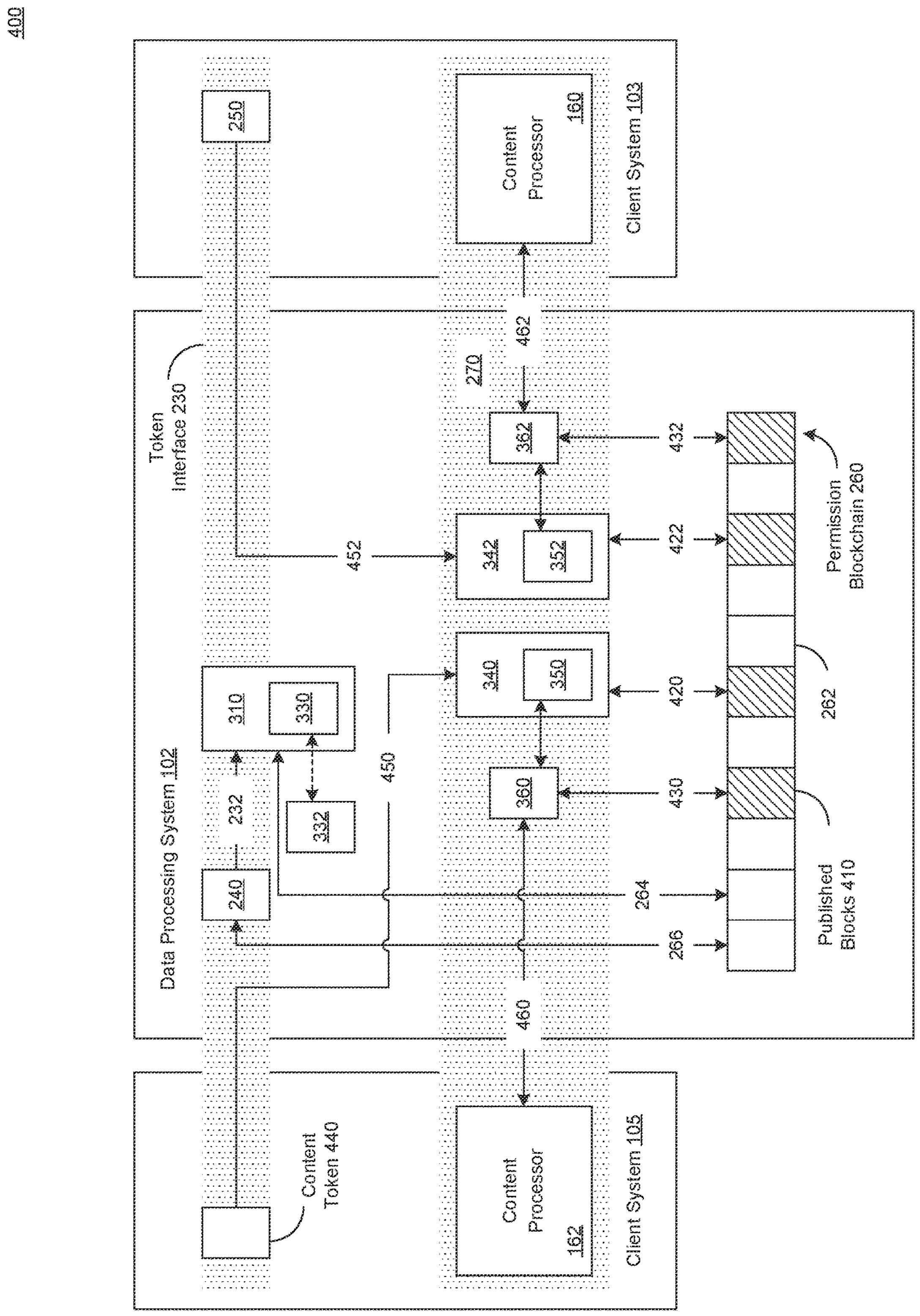
FIG. 4 illustrates an architecture to modify publication to a blockchain of a transformed NFT and a transformed content object linked with the NFT, in accordance with present implementations.

FIG. 4 illustrates an architecture to modify publication to a blockchain of a transformed NFT and a transformed content object linked with the NFT, in accordance with present implementations. As illustrated by way of example in FIG. 4, an example architecture 400 can include the data processing system 102, the client system 103, and a client system 105. The data processing system can include the token interface 230, the secure NFT 240, the content token 250, the permission blockchain 260 with the blocks 262, the control link 264, the secure NFT link 266, the content interface 270, the primary smart contract control structure 310, the primary NFT 330, the primary content object 332, the transformed smart contract control structures 340 and 342, the transformed NFTs 350 and 352, the transformed content objects 360 and 362, published blocks 410, transformed smart contract links 420 and 422, transformed content object links 430 and 432, client links 450 and 452, and content links 460 and 462. The client system 105 can correspond in one or more of structure and operation to the client system 103, and can be distinct and remote from the data processing system and the client system 103. The client system 105 can include a content processor 162 and a content token 440.

The published blocks 410 can include one or more blocks of the permission blockchain 260 linked with various ones of the transformed smart contract control structures 340 and 342 and the transformed content objects 360 and 362. The primary smart contract control structure 310 can be compatible with the permission blockchain 260 and can modify the permission blockchain 260. For example, the primary smart contract control structure 310 can add a block to the permission blockchain 260 at any end of the blockchain according to a last-in-first-out (LIFO) structure or a first-in-first-out (FIFO) structure, or can add a block 262 within the permission blockchain 260 between two existing blocks 262.

The primary smart contract control structure 310 can modify an existing block of the permission blockchain 260 at any end of the blockchain, or can add a published block 410 within the permission blockchain 260 between two existing blocks 262. The primary smart contract control structure 310 can add one or more published blocks 410 to the permission blockchain 260 each corresponding to a particular one of the transformed smart contract control structures 340 and 342. The primary smart contract control structure 310 can remove or replace one or more published blocks 410 to the permission blockchain 260 corresponding to the primary smart contract control structure 310 and the primary content object 332. Thus, the primary smart contract control structure 310 can replace itself and the primary content object 332 on the permission blockchain 260, with one or more smart contract control structures and content objects generated or minted in accordance with the transform token 250. The transformed smart contract links 420 and 422 can respectively link the transformed smart contract control structures 340 and 342 with the permission blockchain 260. The transformed content object links 430 and 432 can respectively link the transformed content objects 360 and 262 with the permission blockchain 260. The primary smart contract control structure 310 can generate the transformed smart contract links 420 and 422 and the transformed content object links 430 and 432 in accordance with a publication process to replace the primary content object 332 with the transformed content objects 360 and 362 based on the transform metric of the transform token 250.

The content token 440 can correspond in one or more of structure and operation to the content token 250, and be generated based on the transform token 320. The primary smart contract control structure 310 can generate the content token 440 to be compatible with the primary smart contract control structure 310. The content token 440 can, for example, be generated or minted in response to generation of the transformed smart contract control structure 340. For example, the content token 440 can be restricted to compatibility with the primary smart contract control structure 310. The data processing system 102 can transmit the content token 440 to the client system 105 by the token interface 230, for example, in response to generation of the transformed smart contract control structure 340. The primary smart contract control structure 310 can modify the content token 250 to link with the transformed smart contract control structure 342, and to disable or remove a link with the primary smart contract control structure 310.

The client links 450 and 452 can respectively link the client systems 105 and 103 respectively with the transformed smart contract control structures 340 and 342. The content links 460 and 462 can respectively link the content processors 162 and 160 respectively with the transformed content objects 360 and 362. Each of the client system 105 and the client system 103 can then respectively obtain output of the transformed content objects 360 and 362 in accordance with the transform metric of the transform token 320. The client system 103 can, for example, be excluded from a transformation process, if for example, the transform token 320 indicates that the transformed content objects 360 and 362 are to be placed under the control of a computing system other than the client system 103 or a customer other than a customer authorized to the client system 103. In this example, a disbursing entity may relinquish control of a content object and its NFTs to multiple parties excluding the disbursing entity. Such a disbursement can include, for example a sale of all shares linked with a content object or all temporal rights in a content object. Thus, assets governed by various NFTs can be divided and transmitted by an improved smart content and blockchain architecture as discussed by way of example herein.

Figure 5:
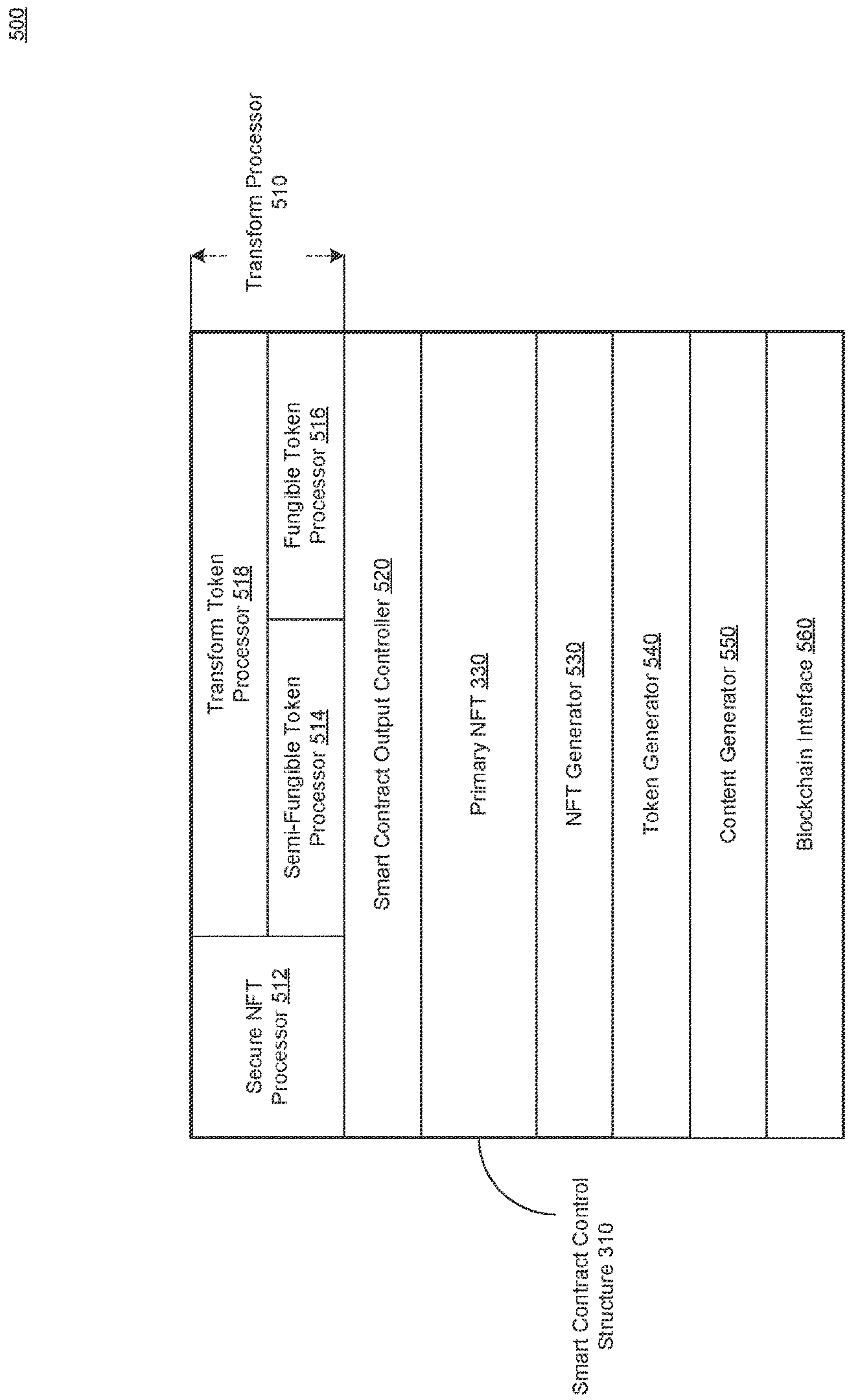
FIG. 5 illustrates a smart contract control architecture in accordance with present implementations.

FIG. 5 illustrates a smart contract control architecture in accordance with present implementations. As illustrated by way of example in FIG. 5, an example smart contract control architecture 500 can include the smart contract control structure 310. The smart contract control structure 310 can include the primary NFT 330, a transform processor 510, a secure NFT processor 512, a semi-fungible token processor 514, a fungible token processor 516, a transform token processor 518, a smart contract output controller 520, an NFT generator 530, a token generator 540, a content generator 550, and a blockchain interface 560. One or more of the transformed smart contract control structures 340 and 342 can have a structure or operation corresponding to the primary smart contract control structure 310.

The transform processor 510 can communication with and validate one or more tokens. The transform processor 510 can include one or more interfaces corresponding to an API or a smart contract interface, for example. A smart contract interface can include one or more executable instructions integrated with a smart contract. The smart contract interface can execute instructions at the smart contract or triggered by the smart contract in response to detection of objects or conditions external to the smart contract. The transform processor 510 can comprise at least a portion of a control structure of the smart contract. The transform processor 510 can include a control structure. The transform processor 510 can include a secure NFT processor 512, a semi-fungible token processor 514, a fungible token processor 516, and a content token processor 518.

The secure NFT processor 512 TTT can detect the presence of a secure NFT 240, and can determine whether the secure NFT 240 is compatible with the secure NFT processor 512. The secure NFT processor 512 can be configured to be compatible with a particular secure NFT 240, or can be generated to be compatible with a particular secure NFT 240. For example, the secure NFT processor 512 can be integrated with or store a hash based on a particular secure NFT 240 and a hash processor operable to generate a hash based on any secure NFT 240. The secure NFT processor 512 can generate a hash in response to detecting the presence of the secure NFT 240, and can determine whether the secure NFT 240 is compatible with the smart contract control structure, in response generating the hash, by comparing the generated hash with the stored hash. The secure NFT processor 512 can include logic to detect a secure NFT 240 passed to it, by, for example, a JSON object or a header argument.

The semi-fungible token processor 514 can detect the presence of a semi-fungible token, and can determine whether the semi-fungible token is compatible with the semi-fungible token processor 514. The semi-fungible token processor 514 can be configured to be compatible with a particular semi-fungible token, or can be generated to be compatible with a particular semi-fungible token. The semi-fungible token processor 514 can be configured to be compatible with a plurality of tokens having a particular characteristic, or can be generated to be compatible with a plurality of tokens having a particular characteristic. A particular characteristic can include, for example, a particular identifier or portion of an identifier of a token. For example, the semi-fungible token processor 514 can be integrated with or store a hash based on a particular semi-fungible token and a hash processor operable to generate a hash based on any semi-fungible token. The semi-fungible token processor 514 can generate a hash in response to detecting the presence of the semi-fungible token, and can determine whether the semi-fungible token is compatible with the smart contract control structure 310, in response generating the hash, by comparing the generated hash with the stored hash. The semi-fungible token processor 514 can include logic to detect a semi-fungible token passed to it, by, for example, an activation instruction from the transform token processor 518.

The fungible token processor 516 can detect the presence of a fungible token, and can determine whether the fungible token is compatible with the fungible token processor 516. The fungible token processor 516 can be configured to be compatible with a particular fungible token, or can be generated to be compatible with a particular fungible token. The fungible token processor 516 can be configured to be compatible with a plurality of tokens having a particular characteristic, or can be generated to be compatible with a plurality of tokens having a particular characteristic. A particular characteristic can include, for example, a particular identifier or portion of an identifier of a token. For example, the fungible token processor 516 can be integrated with or store a hash based on a particular fungible token and a hash processor operable to generate a hash based on any fungible token. The fungible token processor 516 can generate a hash in response to detecting the presence of the fungible token, and can determine whether the fungible token is compatible with the smart contract control structure 310, in response generating the hash, by comparing the generated hash with the stored hash. The fungible token processor 516 can include logic to detect a fungible token passed to it, by, for example, an activation instruction from the transform token processor 518.

The transform token processor 518 can detect the presence of a semi-fungible token or a fungible token, and can transmit the semi-fungible token or the fungible token respectively to the semi-fungible token processor 514 or the fungible token processor 516. The transform token processor 518 can be configured to be compatible with any NFT, semi-fungible fungible token or fungible token, or can be generated to be compatible with any semi-fungible token or fungible token. The transform token processor 518 can be configured to identify a semi-fungible fungible token or a fungible token, or can be generated to identify any semi-fungible token or fungible token. For example, the transform token processor 518 can identify a particular identifier or portion of an identifier of a token to determine whether the token includes a semi-fungible token or a fungible token. The transform token processor 518 can transmit the token to the semi-fungible token processor 514 in response to a determination that the token includes a semi-fungible token. The transform token processor 518 can transmit the token to the fungible token processor 516 in response to a determination that the token includes a fungible token. For example, the transform token processor 518 can detect a semi-fungible content token 250 corresponding to limited-release content or assets, and can detect a fungible content token 250 corresponding to wide-release content or assets.

The smart contract output controller 520 can selectively transmit output from the primary NFT 330 based on determinations from one or more of the secure NFT processor 512, the semi-fungible token processor 514, and the fungible token processor 516. For example, the smart contract output controller 520 can include a communication channel and a control structure to activate or deactivate the communication channel. The communication channel can communicatively couple the primary NFT 330 with a communication interface external to the smart contract control structure. For example, the smart contract output controller 520 can activate the communication channel in response to a determination that a secure NFT 240 and a content token 250 are both compatible with the smart contract control structure 310. The smart contract output controller 520 can perform corresponding actions with respect to any token stored with the smart contract and the transform processor, including any transformed NFT and any primary NFT.

The NFT generator 530 can generate one or more NFTs in accordance with a transform token obtained at the transform processor 510. For example, the NFT generator 530 can generate multiple NFTs based on a number of new content objects or NFTs indicated by an obtained transform token. For example, the NFT generator 530 can generate one or more NFTs each including a link or a reference to the primary NFT 330 to identify a source NFT corresponding to the NFT minted by the NFT generator 530. For example, the NFT generator 530 can generate one or more NFTs each including a link or a reference to an NFT from which the new NFTs are minted. Thus, the NFT generator can provide a technical improvement of validating a minting of an NFT based on a provenance parameter embedded in the NFT. The provenance parameter can include a hash of the primary NFT 330 or the NFT from which the new NFTs are minted, for example. Generating an NFT and minting an NFT can be used interchangeably.

The token generator 540 can generate one or more content tokens in accordance with a transform token obtained at the transform processor 510. For example, the token generator 540 can generate multiple content tokens based on a number of new content objects or NFTs indicated by an obtained transform token, and linked with respective smart contract control structures. For example, the token generator 540 can generate one or more content tokens each linked with a particular smart contract control structure 340 or 342 with which the respective content token is compatible. The token generator 540 can thus generate a corresponding number of "owner keys" or "consumer keys" that can control restrictions on output by the particular transformed content object linked with the particular smart contract control structure compatible with the particular content token. The token generator 540 can modify and delete content tokens linked with primary NFTs or primary smart contract control structures, to update control of a partial transfer of content object control. For example, the token generator 540 can create a content token controlling 25% of shares of a financial equity, and modify a content token originally controlling 100% of the financial equity to link with a transformed smart contract control structure controlling 75% of the financial equity. The token generator 540 can make the modification in accordance with an example for a change in control of 25% of a financial equity controlled by the original token holder.

The content generator 550 can generate one or more content objects in accordance with a transform token obtained at the transform processor 510. For example, content generator 550 can generate multiple content tokens based on a number of new content objects or NFTs indicated by an obtained transform token, and linked with respective smart contract control structures. For example, the content generator 550 can generate one or more content objects each linked with a particular smart contract control structure 340 or 342 by which the respective content object is controlled. The content generator 550 can modify and delete content objects linked with primary NFTs or primary smart contract control structures, to update control of a partial transfer of content object control. The content generator can receive the transform metric from the transform processor, in response to an extraction process of the transform metric from the transform toke 320 by the transform processor or any processor thereof.

The blockchain interface 560 can include an API compatible with the permission blockchain 260. The blockchain interface 560 can selectively add, modify, and delete blocks from the permission blockchain 260. The blockchain interface 560 can add, modify, and delete blocks in accordance with restrictions or interfaces of the permission blockchain 260, and can add, modify, and delete blocks independently of the restrictions or interfaces of the permission blockchain 260 at any portion or index of the permission blockchain 260.

Figure 6:
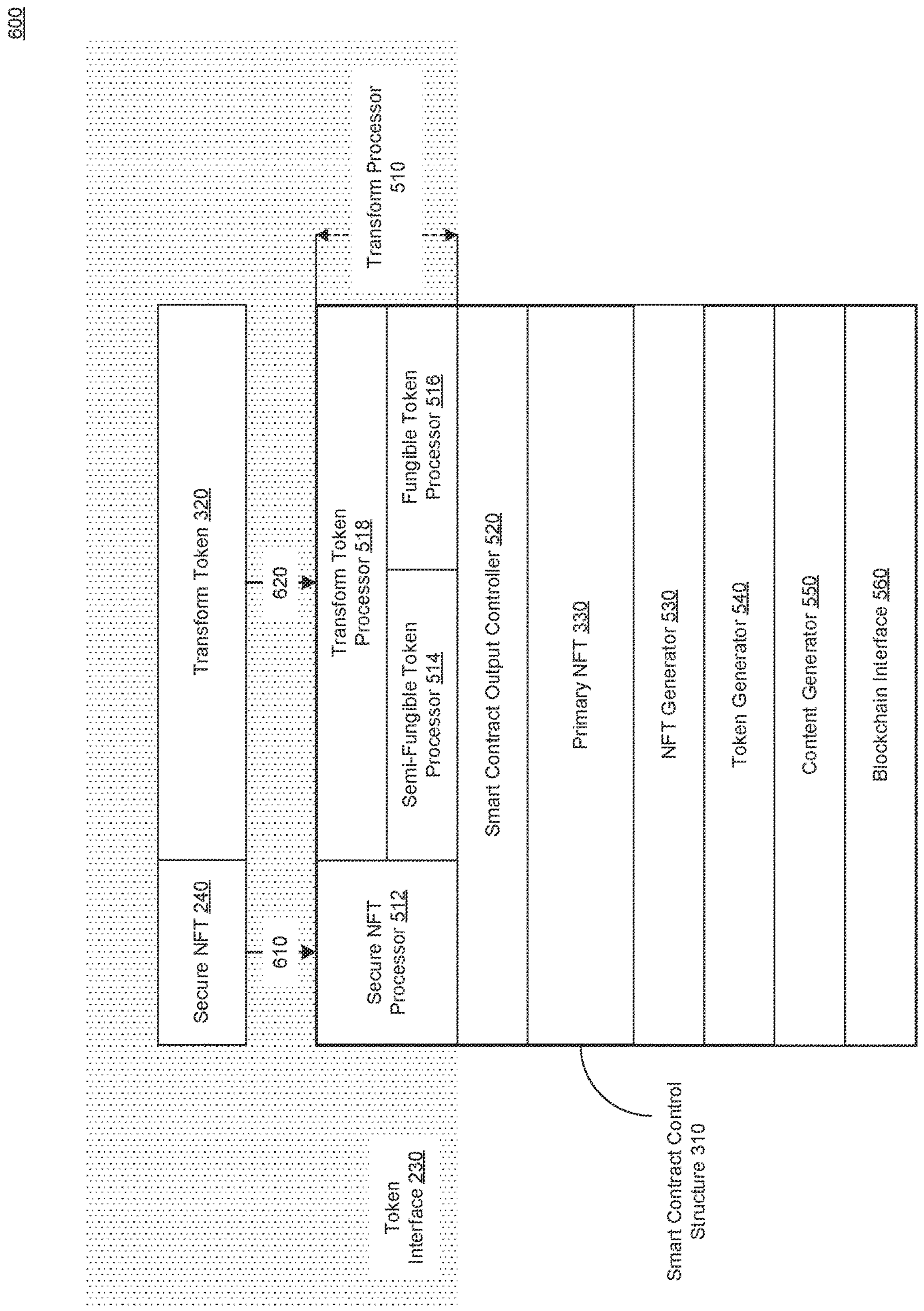
FIG. 6 illustrates a smart contract control architecture compatible with a transform token interface, in accordance with present implementations.

FIG. 6 illustrates a smart contract control architecture compatible with a transform token interface, in accordance with present implementations. As illustrated by way of example in FIG. 6, an example smart contract control architecture 600 can include the token interface 230, the secure NFT 240, the transform token 320, and the smart contract control structure 310. The token interface 230 can perform detection 610 of the secure NFT 240, and detection 620 of the transform token 320. The detection 610 can be responsive to an action by the token interface 230 to transmit the secure NFT 240 to the smart contract control structure 310. The secure NFT processor 512 can detect the secure NFT 240 obtained by the smart contract control structure 310 via the transform processor 510. The detection 620 can be responsive to an action by the token interface 230 to transmit the transform token 320 to the smart contract control structure 310. The transform token processor 518 can detect the transform token 320 obtained by the smart contract control structure 310 via the token interface 230.

Figure 7:
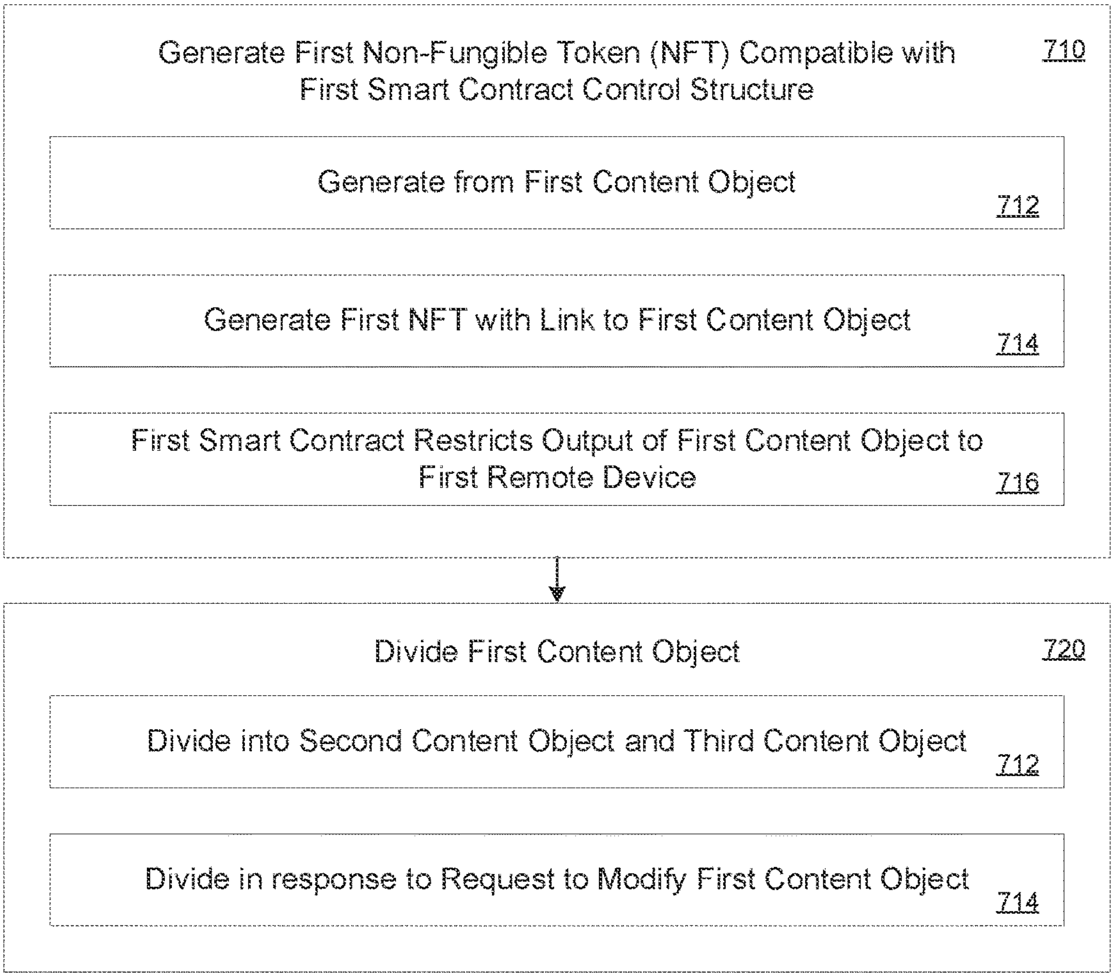
FIG. 7 illustrates a method of dividing non-fungible tokens (NFTs) to divide restricted output of various content objects, in accordance with present implementations.

FIG. 7 illustrates a method of dividing non-fungible tokens (NFTs) to divide restricted output of various content objects. At least one of the example systems 100, 200, 300 and 400, or the example structures 500 and 600, can perform method 700 according to present implementations. The method 700 can begin at 710. The first control structure can include a first smart contract, the second control structure can include a second smart contract, and the third control structure can include a third smart contract.

At 710, the method can generate a first NFT compatible with a first smart contract control structure. 710 can include at least one of 712, 714 and 716. At 712, the method can generate a first NFT based on a first content object. At 714, the method can generate a first NFT with a link to a first content object. At 716, the method can generate a first NFT compatible with a first smart contract control structure that restricts output of a first content object to a first remote device. The method 700 can then continue to 720. At 720, the method can divide a first content object. 720 can include at least one of 712 and 714. At 712, the method can divide a first content object into a second content object and a third content object. At 714, the method can divide a first content object in response to a request to modify the first content object.

Figure 8:
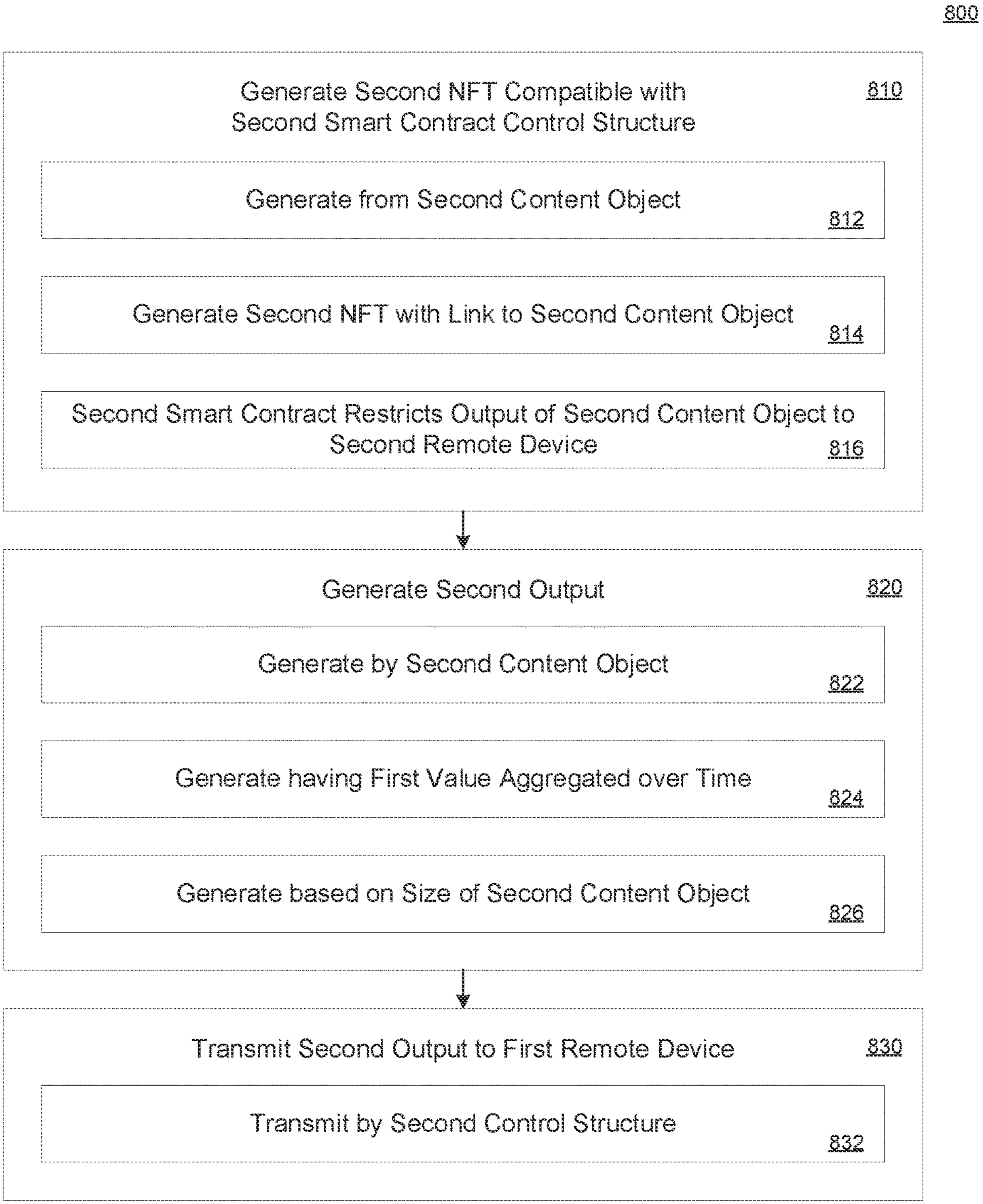
FIG. 8 illustrates a method of dividing non-fungible tokens (NFTs) to divide restricted output of various content objects, in accordance with present implementations.

FIG. 8 illustrates a method of dividing non-fungible tokens (NFTs) to divide restricted output of various content objects. At least one of the example systems 100, 200, 300 and 400, or the example structures 500 and 600, can perform method 800 according to present implementations. The method 800 can begin at 810.

At 810, the method can generate a second NFT compatible with a second smart contract control structure. 810 can include at least one of 812, 814 and 816. At 812, the method can generate a second NFT based on a second content object. At 814, the method can generate a second NFT with a link to a second content object. At 816, the method can generate a second NFT compatible with a second smart contract control structure that restricts output of a second content object to a second remote device. The method 800 can then continue to 820. At 820, the method can generate a second output. 820 can include at least one of 822, 824 and 826. At 822, the method can generate a second output by a second content object. At 824, the method can generate a second output having a first value aggregated over time. At 826, the method can generate a second output based on a size of a second content object. The method 800 can then continue to 830. At 830, the method can transmit a second output to a first remote device. 830 can include 832. At 832, the method can transmit a second output to a first remote device by a second control structure.

Figure 9:
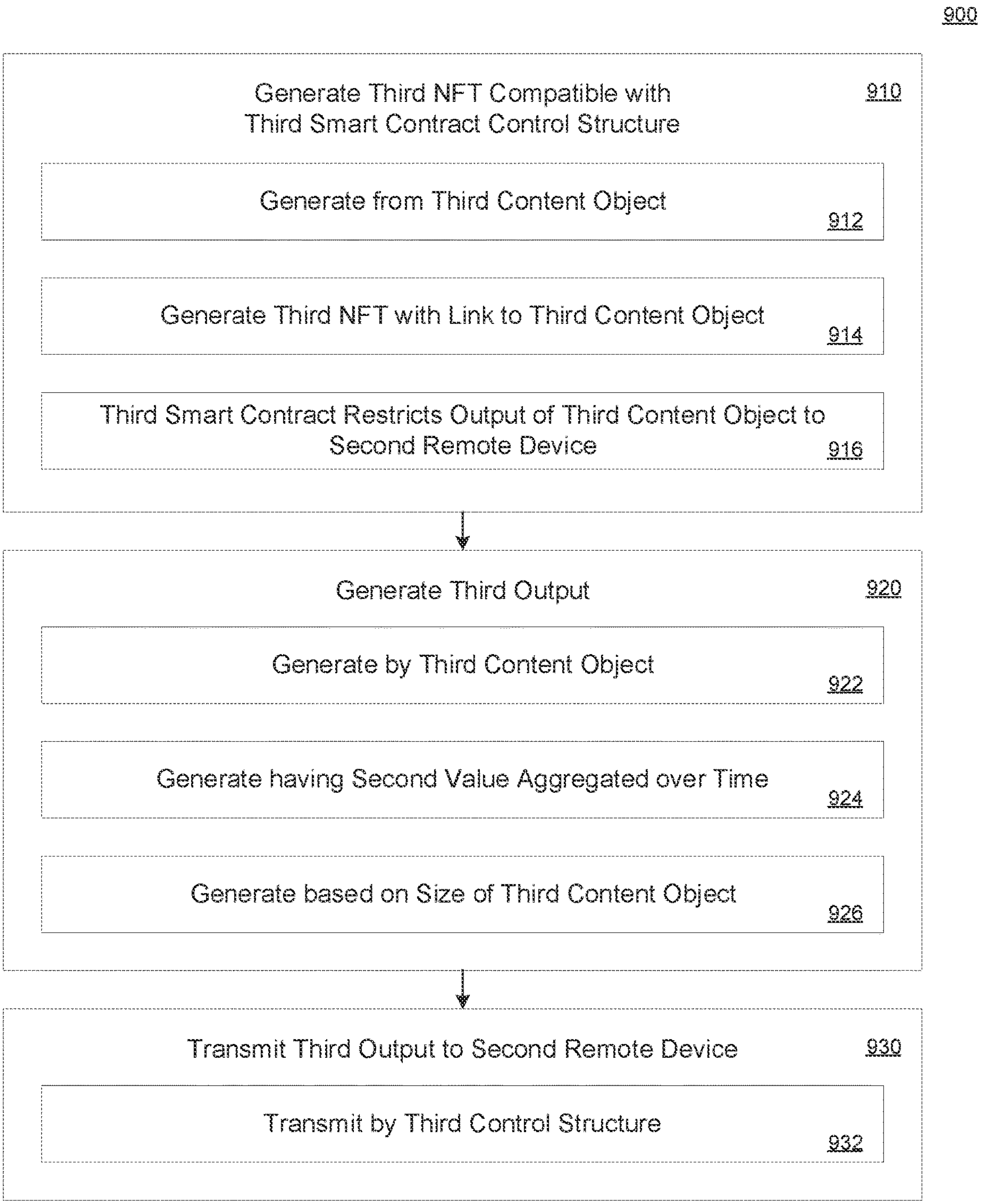
FIG. 9 illustrates a method of dividing non-fungible tokens (NFTs) to divide restricted output of various content objects, in accordance with present implementations.

FIG. 9 illustrates a method of dividing non-fungible tokens (NFTs) to divide restricted output of various content objects. At least one of the example systems 100, 200, 300 and 400, or the example structures 500 and 600, can perform method 900 according to present implementations. The method 900 can begin at 910.

At 910, the method can generate a third NFT compatible with a third smart contract control structure. 910 can include at least one of 912, 914 and 916. At 912, the method can generate a third NFT based on a third content object. At 914, the method can generate a third NFT with a link to a third content object. At 916, the method can generate a third NFT compatible with a third smart contract control structure that restricts output of a third content object to a third remote device. The method 900 can then continue to 920. At 920, the method can generate a third output. 920 can include at least one of 922, 924 and 926. At 922, the method can generate a third output by a third content object. At 924, the method can generate a third output having a second value aggregated over time. At 926, the method can generate a third output based on a size of a third content object. The method 900 can then continue to 930. At 930, the method can transmit a third output to a second remote device. 930 can include 932. At 932, the method can transmit a third output to a second remote device by a third control structure.

A method can include detecting, by the first control structure, the first NFT and a fourth NFT linked with the processor. The method can include validating, in response to the detection by the first control structure, the request to modify the content object. The method can include detecting, by the second control structure, the second NFT and a fourth NFT linked with the processor. The method can include transmit, by the second control structure in response to the detection by the second control structure, the second output to the first remote device. The method can include detecting, by the third control structure, the third NFT and a fourth NFT linked with the processor. The method can include transmitting, by the third control structure in response to the detection by the third control structure, the third output to the second remote device.

A computer readable medium can detect, by the processor via the first control structure, the first NFT and a fourth NFT linked with the processor. The computer readable medium can validate, by the processor and in response to the detection by the first control structure, the request to modify the first content object. The computer readable medium can detect, by the processor via the second control structure, the second NFT and a fourth NFT linked with the processor. The computer readable medium can transmit, by the processor via the second control structure in response to the detection by the second control structure, the second output to the first remote device. The computer readable medium can detect, by the third control structure, the third NFT and a fourth NFT linked with the processor. The computer readable medium can transmit, by the processor via the third control structure in response to the detection by the third control structure, the third output to the second remote device.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A system to transmit portions of output of a non-fungible token (NFT) to multiple remote devices, the system comprising:

memory storing instructions and one or more processors configured to execute the instructions to:

generate, based on a first content object, a first NFT including a first link with the first content object;

generate a first smart contract control structure restricting a first output of the first content object to a first remote device of the multiple remote devices, the first remote device being remote from the one or more processors, the first smart contract control structure comprises a first smart contract output controller comprising a first communication channel and a first control structure configured to activate or deactivate the first communication channel, the first communication channel communicatively couples the one or more processors with the first remote device, the first smart contract control structure further comprises a first encapsulation layer, the first encapsulation layer is configured to encrypt the first content object and control output of the first content object by uniformly and concurrently decrypting the first content object;

receive a request to modify the first content object;

in response to receiving the request, divide the first content object into a second content object and a third content object, the second content object having a first portion of the first content object and the third content object having a second portion of the first content object;

generate, based on the second content object, a second NFT including a second link with the second content object;

generate a second smart contract control structure restricting a second output of the second content object to the first remote device, the second smart contract control structure comprises a second smart contract output controller comprising a second communication channel and a second control structure configured to activate or deactivate the second communication channel, the second communication channel communicatively couples the one or more processors with the first remote device, the second smart contract control structure further comprises a second encapsulation layer, the second encapsulation layer is configured to encrypt the second content object and control output of the second content object by uniformly and concurrently decrypting the second content object;

generate, based on the third content object, a third NFT including a third link with the third content object;

generate a third smart contract control structure restricting a third output of the third content object to a second remote device of the multiple remote devices, the second remote device being remote device remote from the one or more processors, the third smart contract control structure comprises a third smart contract output controller comprising a third communication channel and a third control structure configured to activate or deactivate the third communication channel, the third communication channel communicatively couples the one or more processors with the second remote device, the third smart contract control structure further comprises a third encapsulation layer, the third encapsulation layer is configured to encrypt the third content object and control output of the third content object by uniformly and concurrently decrypting the third content object;

transmit, by the second smart contract control structure, the second output to the first remote device; and transmit, by the third smart contract control structure, the third output to the second remote device.

2. The system of claim 1, the instructions further comprising:

generate, by the second content object, the second output comprising a first value aggregated over a first time period; and generate, by the third content object, the third output comprising a second value aggregated over a second time period subsequent to the first time period.

3. The system of claim 1, wherein each of the first smart contract control structure, the second smart contract control structure, and the third smart contract control structure comprise:

a gateway component comprising one or more instructions configured to restrict or prevent access to a corresponding NFT.

4. The system of claim 1, the instructions further comprising:

generate, by the second content object, the second output based on a size of the second content object; and generate, by the third content object, the third output based on a size of the third content object.

5. The system of claim 4, the first output having a first magnitude, the second output having a second magnitude corresponding to a proportion between the first magnitude and the second magnitude, and the third output having a third magnitude corresponding to a proportion between the first magnitude and the third magnitude.

6. The system of claim 1, the instructions further comprising:

detect, by the first control structure, the first NFT and a fourth NFT linked with the one or more processors;

validate, in response to the detection by the first control structure, the request to modify the first content object.

7. The system of claim 1, the instructions further comprising:

detect, by the second control structure, the second NFT and a fourth NFT linked with the one or more processors; and transmit, by the second control structure in response to the detection by the second control structure, the second output to the first remote device.

8. The system of claim 1, the instructions further comprising:

detect, by the third control structure, the third NFT and a fourth NFT linked with the one or more processors; and transmit, by the third control structure in response to the detection by the third control structure, the third output to the second remote device.

9. The system of claim 1, the first control structure comprising a first smart contract, the second control structure comprising a second smart contract, and the third control structure comprising a third smart contract.

10. A method to transmit portions of output of a non-fungible token (NFT) to multiple remote devices, the method comprising:

generating, based on a first content object, a first NFT including a first link with the first content object;

generating a first smart contract control structure restricting a first output of the first content object to a first remote device of the multiple remote devices, the first remote device being remote from a processor of a system, the first smart contract control structure comprises a first smart contract output controller comprising a first communication channel and a first control structure configured to activate or deactivate the first communication channel, the first communication channel communicatively couples the processor with the first remote device, the first smart contract control structure further comprises a first encapsulation layer, the first encapsulation layer is configured to encrypt the first content object and control output of the first content object by uniformly and concurrently decrypting the first content object;

receiving a request to modify the first content object;

in response to receiving the request, dividing the first content object into a second content object and a third content object, the second content object having a first portion of the first content object and the third content object having a second portion of the first content object;

generating, based on the second content object, a second NFT including a second link with the second content object;

generating a second smart contract control structure restricting a second output of the second content object to the first remote device the second smart contract control structure comprises a second smart contract output controller comprising a second communication channel and a second control structure configured to activate or deactivate the second communication channel, the second communication channel communicatively couples the processor with the first remote device, the second smart contract control structure further comprises a second encapsulation layer, the second encapsulation layer is configured to encrypt the second content object and control output of the second content object by uniformly and concurrently decrypting the second content object;

generating, based on the third content object, a third NFT including a third link with the third content object;

generating a third smart contract control structure restricting a third output of the third content object to a second remote device of the multiple remote devices, the second remote device being remote from the processor, the third smart contract control structure comprises a third smart contract output controller comprising a third communication channel and a third control structure configured to activate or deactivate the third communication channel, the third communication channel communicatively couples the processor with the second remote device, the third smart contract control structure further comprises a third encapsulation layer, the third encapsulation layer is configured to encrypt the third content object and control output of the third content object by uniformly and concurrently decrypting the third content object;

transmitting, by the second smart contract control structure, the second output to the first remote device; and transmitting, by the third smart contract control structure, the third output to the second remote device.

11. The method of claim 10, further comprising:

generating, by the second content object, the second output comprising a first value aggregated over a first time period; and generating, by the third content object, the third output comprising a second value aggregated over a second time period subsequent to the first time period.

12. The method of claim 10, the first output comprising a third value aggregated over the first time period and the second time period.

13. The method of claim 10, further comprising:

generating, by the second content object, the second output based on a size of the second content object; and generating, by the third content object, the third output based on a size of the third content object.

14. The method of claim 13, the first output having a first magnitude, the second output having a second magnitude corresponding to a proportion between the first magnitude and the second magnitude, and the third output having a third magnitude corresponding to a proportion between the first magnitude and the third magnitude.

15. The method of claim 10, further comprising:

detecting, by the first control structure, the first NFT and a fourth NFT linked with the processor;

validating, in response to the detection by the first control structure, the request to modify the content object.

16. The method of claim 10, further comprising:

detecting, by the second control structure, the second NFT and a fourth NFT linked with the processor; and transmit, by the second control structure in response to the detection by the second control structure, the second output to the first remote device.

17. The method of claim 10, further comprising:

detecting, by the third control structure, the third NFT and a fourth NFT linked with the processor; and transmitting, by the third control structure in response to the detection by the third control structure, the third output to the second remote device.

18. The method of claim 10, the first control structure comprising a first smart contract, the second control structure comprising a second smart contract, and the third control structure comprising a third smart contract.

19. A non-transitory computer readable medium including instructions stored thereon and executable by a processor for transmitting portions of output of a non-fungible token (NFT) to multiple remote devices, the instructions comprising:

generate, by the processor and based on a first content object, a first NFT including a first link with the first content object;

generate a first smart contract control structure restricting a first output of the first content object to a first remote device of the multiple remote devices, the first remote device being remote from the processor, the first smart contract control structure comprises a first smart contract output controller comprising a first communication channel and a first control structure configured to activate or deactivate the first communication channel, the first communication channel communicatively couples the processor with the first remote device, the first smart contract control structure further comprises a first encapsulation layer, the first encapsulation layer is configured to encrypt the first content object and control output of the first content object by uniformly and concurrently decrypting the first content object;

receive, by the processor, a request to modify the first content object;

in response to receiving the request, divide, by the processor, the first content object into a second content object and a third content object, the second content object having a first portion of the first content object and the third content object having a second portion of the first content object;

generate, by the processor and based on the second content object, a second NFT including a second link with the second content object;

generate a second smart contract control structure restricting a second output of the second content object to the first remote device, the second smart contract control structure comprises a second smart contract output controller comprising a second communication channel and a second control structure configured to activate or deactivate the second communication channel, the second communication channel communicatively couples the processor with the first remote device, the second smart contract control structure further comprises a second encapsulation layer, the second encapsulation layer is configured to encrypt the second content object and control output of the second content object by uniformly and concurrently decrypting the second content object;

generate, by the processor and based on the third content object, a third NFT including a third link with the third content object;

generate a third smart contract control structure restricting a third output of the third content object to a second remote device of the multiple remote devices, the second remote device being remote from the processor, the third smart contract control structure comprises a third smart contract output controller comprising a third communication channel and a third control structure configured to activate or deactivate the third communication channel, the third communication channel communicatively couples the processor with the second remote device, the third smart contract control structure further comprises a third encapsulation layer, the third encapsulation layer is configured to encrypt the third content object and control output of the third content object by uniformly and concurrently decrypting the third content object;

transmit, by the processor via the second smart contract control structure, the second output to the first remote device; and transmit, by the processor via the third smart contract control structure, the third output to the second remote device.

20. The non-transitory computer readable medium of claim 19, the instructions further comprising:

detect, by the processor via the first control structure, the first NFT and a fourth NFT linked with the processor;

validate, by the processor and in response to the detection by the first control structure, the request to modify the first content object;

detect, by the processor via the second control structure, the second NFT and a fourth NFT linked with the processor;

transmit, by the processor via the second control structure in response to the detection by the second control structure, the second output to the first remote device;

detect, by the third control structure, the third NFT and a fourth NFT linked with the processor; and transmit, by the processor via the third control structure in response to the detection by the third control structure, the third output to the second remote device.

* * * * *